Figure 1:
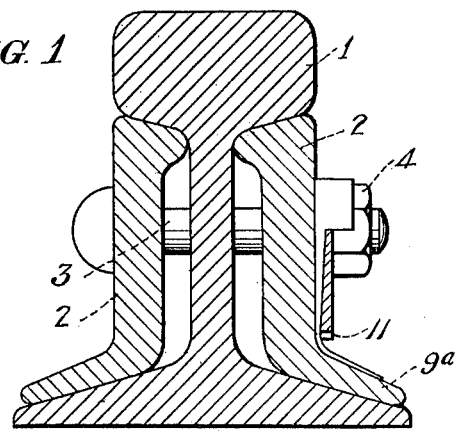

C. TOTTEN.
NUT LOCKING DEVICE.
APPLICATION FILED MAR. 10, 1911.

994,547.

Patented June 6, 1911.

WITNESSES:
J. R. Mahaney
K. H. Butler

INVENTOR.
C. Totten
BY
ATTORNEY.

THE NORRIS PETERS CO., WASHINGTON, D. C.

UNITED STATES PATENT OFFICE.

CLEOPHAS TOTTEN, OF JEWETT, OHIO.

NUT-LOCKING DEVICE.

994,547.  Specification of Letters Patent.  Patented June 6, 1911.

Application filed March 10, 1911. Serial No. 613,486.

*To all whom it may concern:*

Be it known that I, CLEOPHAS TOTTEN, a citizen of the United States of America, residing at Jewett, in the county of Harrison and State of Ohio, have invented certain new and useful Improvements in Nut-Locking Devices, of which the following is a specification, reference being had therein to the accompanying drawing.

This invention relates to nut locks, and the objects of the invention are to provide a nut locking device that can be advantageously used in connection with rail joints, bridges, rolling stock and structures subjected to vibratory stresses and strains that have a tendency to displace nuts, and to provide a nut lock that can be used in connection with the ordinary type of bolt and nut.

Further objects of the invention are to provide a nut locking device that can be easily and quickly installed without the use of skilled labor, and to accomplish the above objects by a mechanical construction that is simple, positive in its action, durable and efficient for retaining nuts upon bolts.

These and other objects as may hereinafter appear are attained by the novel construction and arrangement of parts to be presently described and then claimed.

Reference will now be had to the drawing, wherein:—

Figure 2:
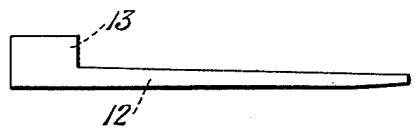
Figure 3:
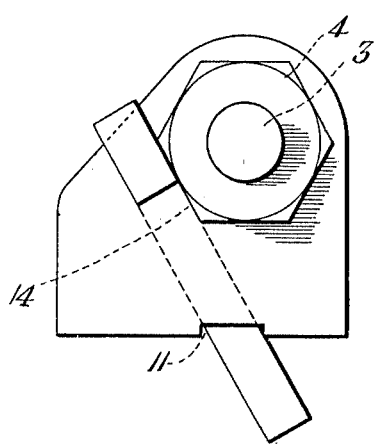
Figure 4:
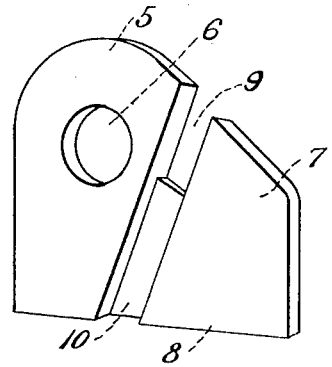

Figure 1 is a cross sectional view of a rail joint provided with the nut locking device. Fig. 2 is a plan of a key forming part of the device. Fig. 3 is a front elevation of the nut locking device as applied to a bolt and nut, and Fig. 4 is a perspective view of a plate or washer forming the body of the device.

As an example of the use of the nut lock, there is illustrated a rail 1 braced by splice bars 2 connected to said rail by a bolt 3 and a nut 4. Interposed between one of the splice bars 2 and the nut 4 is a plate 5 for an opening 6 providing clearance for the bolt 3. The plate 5 has a side extension 7 and said extension and the plate 5 are of a sufficient depth to present a straight edge 8 upon the angular portion 9ª of a splice bar 2. The upper edge of the extension 7 is provided with an angularly disposed slot 9 in communication with the angular groove 10 formed in the rear side of said plate, the groove 10 alining with the slot 9 and extending to the straight edge 8. The rear wall of the groove 10 is cut away, as at 11 for a purpose that will presently appear.

Mounted in the slot 9 and the groove 10, between the splice bars 2 and the nut 4, is a malleable tapering key 12 having the upper end thereof provided with a head 13 adapted to engage in the slot 9 and protruding a sufficient distance from the front side of the plate 5 to engage one of the facets 14 of the nut 4 and prevent said nut from rotating upon the bolt 3. When the key 12 is driven into the slot 9 and the groove 10, the lower end of said key impinges the angular portion 9ª of the splice bars 2 and rides outwardly upon the splice bars, such movement of the lower end of the key being facilitated by the cut away portion 11 of the plate 5. The key is therefore clenched and can not become accidentally displaced, however, by the use of a suitable instrument, the key can be withdrawn whereby the nut can be removed from the bolt and neither injured by such operation.

The straight edge 8 prevents the plate 5 from rotating upon the bolt 3 and as the key 12 is firmly held by said plate the nut 4 will remain in engagement with the plate and firmly hold the splice bars in engagement with the rail or rails.

From the foregoing it will be observed that the nut locking device consists of few parts, and while in the drawing there is illustrated a preferred embodiment of the invention, it is to be understood that the construction thereof is susceptible to such changes as fall within the scope of the appended claim.

What I claim is:—

In a nut locking device, the combination with a rail, splice bars bracing said rail, a bolt extending through said splice bars and said rail, and a nut detachably mounted upon said bolt, of a plate interposed between said nut and one of said splice bars and having an opening providing clearance for said bolt, an extension carried by said plate and having an angularly disposed slot formed in the upper edge thereof in communication with an alining groove in the rear side of said plate, a tapering malleable key mounted in said groove, a head carried by said key and adapted to engage in said slot and protruding through said slot to engage one end of the facets of said nut, said key having the lower end thereof clenched by impinging said splice bars.

In testimony whereof I affix my signature in the presence of two witnesses.

CLEOPHAS TOTTEN.

Witnesses:
H. E. THOMPSON,
J. C. McMANUS.

Copies of this patent may be obtained for five cents each, by addressing the "Commissioner of Patents, Washington, D. C."